United States Patent [19]

Fish

[11] Patent Number: 5,062,236
[45] Date of Patent: Nov. 5, 1991

[54] FISHING LURE

[76] Inventor: Gerald Fish, P.O. Box 1135, Cape Canaveral, Fla. 32930

[21] Appl. No.: 475,264

[22] Filed: Feb. 5, 1990

[51] Int. Cl.⁵ .............................................. A01K 85/00
[52] U.S. Cl. ................................... 43/42.5; 43/42.52; 43/42.28
[58] Field of Search .................... 43/42.5, 42.4, 42.28, 43/42.51, 42.52

[56] References Cited

U.S. PATENT DOCUMENTS

| | | |
|---|---|---|
| 1,896,132 | 2/1933 | Berberich . |
| 1,939,291 | 12/1933 | Buddle . |
| 2,111,020 | 3/1938 | Arbogast . |
| 2,145,283 | 1/1939 | Accetta . |
| 2,167,163 | 7/1939 | Toepper . |
| 2,168,894 | 8/1939 | Arbogast . |
| 2,214,409 | 9/1940 | Eaby ................................. 43/42.52 |
| 2,238,292 | 4/1941 | Schavey . |
| 2,557,599 | 6/1951 | Dunmire . |
| 2,586,186 | 2/1952 | Swanberg . |
| 2,705,848 | 4/1955 | Stettner . |
| 2,898,700 | 8/1959 | Shillin ............................... 43/42.51 |
| 2,989,816 | 6/1961 | Ebert ................................. 43/42.52 |
| 3,002,311 | 10/1961 | Kyper ................................ 43/42.52 |
| 3,087,274 | 4/1963 | Franklin . |

Primary Examiner—Richard K. Seidel
Assistant Examiner—Patty E. Hong
Attorney, Agent, or Firm—Shlesinger Arkwright Garvey

[57] ABSTRACT

A fishing lure comprising an elongated spoon portion and a flexible tail portion mounted on the spoon portion. The spoon portion includes a longitudinal slot extending from an intermediate part to one end thereof. A plurality of teeth are located along the edges of the spoon portion forming the longitudinal slot. A fish hook is mounted on one face of the spoon portion and extends in overlying relation, and centrally disposed with respect to the longitudinal slot. The tail portion includes a tubular member in sleeved engagement with the fish hook, and held in fixed relation thereto by barbs on the fish hook. The tail portion further includes a part which extends partially through the longitudinal slot and is retained by the teeth along the edges of the spoon portion forming the longitudinal slot.

13 Claims, 1 Drawing Sheet

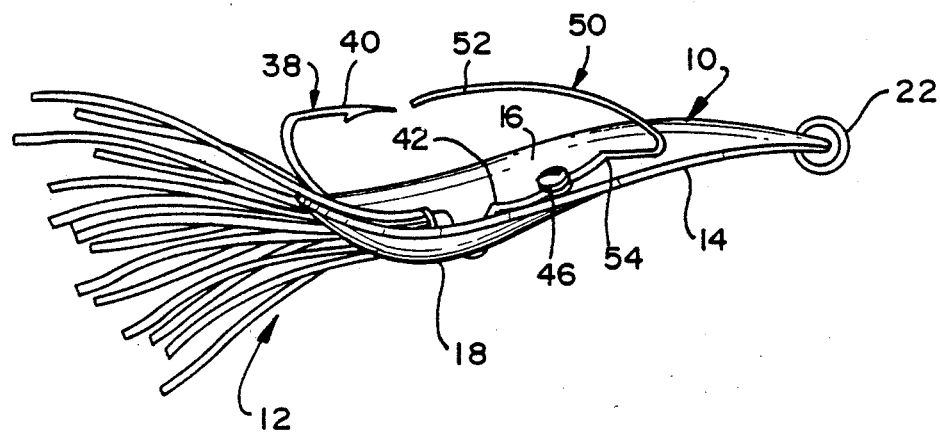
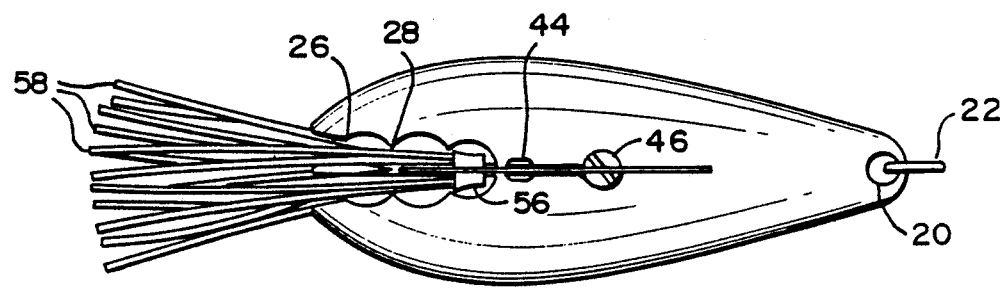
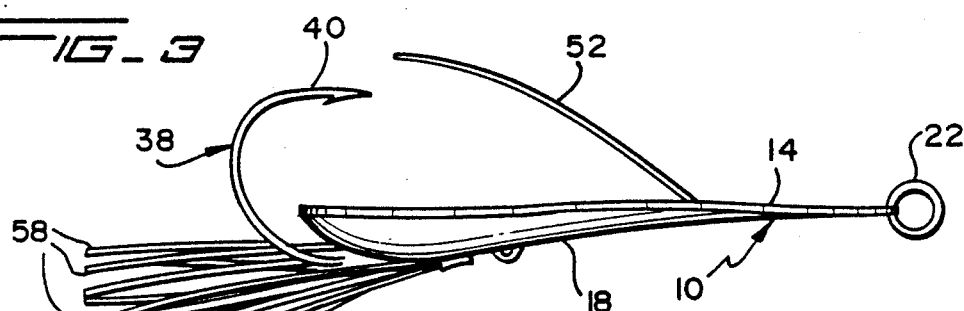
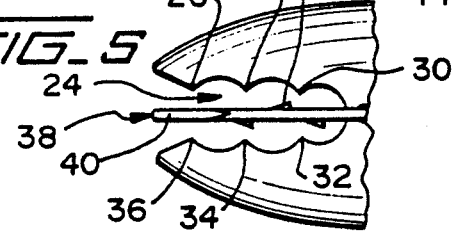
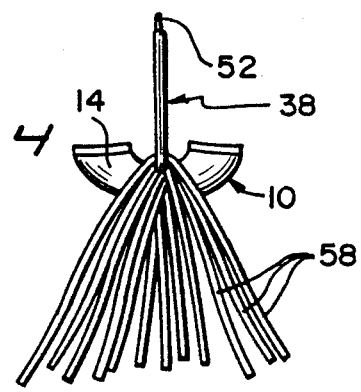

FISHING LURE

This invention is a fishing lure, and more particularly, a fishing lure of the type embodying a spoon portion to which is a fish hook is attached, and a tail portion connected to the spoon portion.

BACKGROUND OF THE INVENTION

Fishing lures of the type embodying a rigid spoon portion and a flexible tail portion have been used by fisherman for many years, which fishing lures are illustrated in U.S. Pat. No. 216,894 issued to J.A. Arbogast on Aug. 8, 1939 and U.S. Pat. No. 2,238,292 issued to E.C. Schavey on Apr. 15, 1941.

Although this type of fishing lure is widely used, these patents illustrate shortcomings which considerably affect the effectiveness thereof. The patent to Arbogast, for example, discloses a fishing lure in which the skirt thereof can be located far behind the hook, with the result that the fish bite the skirt and not the hook. This arrangement also results in a great deal of drag, and less wobble of the spoon, which is an important factor in attracting fish.

Schavey illustrates a common way of attaching the skirt to the spoon, although, with present fishing lures, the skirt is threaded on the hook, which is bolted to the spoon. One of the main problems with this arrangement is that the skirt lies on top of the spoon, and the fish are below the spoon, since these spoons are designed to pass through the water with the hook facing upwardly to avoid entanglement with weeds. Additionally, the skirt will not act to maintain the spoon in a hook up position.

SUMMARY OF THE INVENTION

The fish lure of the present invention comprises a rigid spoon portion and a flexible tail portion. The spoon portion is of conventional elongated, cup-shape, the forward end of which is engaged with a fishing line. The rear end of the spoon portion is provided with a longitudinal slot extending centrally of the rear end of the spoon, which slot is tapered inwardly from the outer edge thereof. A fish hook is secured to one face of the spoon and extends upwardly therefrom, a portion thereof overlying the longitudinal slot of the spoon portion.

A flexible tail portion, such as a flexible skirt, plastic worm or pork rind is mounted in sleeved engagement with the hook, so that a portion of the flexible tail portion hangs downwardly through the longitudinal slot. This enables the fishing lure to be maintained with the spoon portion in a position with the hook facing upwardly at all times.

The spoon portion is provided with a plurality of teeth along the edges of the tapered slot for frictionally engaging the flexible tail portion to hold the latter in position and prevent any relative movement between the flexible tail portion and the spoon portion.

Barbs on the hook also engage a flexible tail portion to maintain fixed engagement between the spoon and tail portions.

DESCRIPTION OF FIGURES OF THE DRAWINGS

FIG. 1 is a perspective view of the fishing lure of the present invention;

FIG. 2 is a top plan view thereof;

FIG. 3 is a side elevational view thereof;

FIG. 4 is a end elevational view thereof; and

FIG. 5 is a fragmentary top plan view of the spoon portion forming a part of the present invention.

DETAILED DESCRIPTION OF THE INVENTION

The fishing lure of the present invention generally comprises a spoon portion 10 on which is mounted a tail portion 12.

Spoon portion 10 includes a body member or blade 14 of conventional elongated cup shape having a concave surface 16 and a convex surface 18. One end of body member 14 is provided with an aperture 20 through which an eyelet 22 passes, which eyelet is adapted to be connected to a fishing line.

It is a salient feature of the present invention to provide a tapering longitudinal slot 24 in spoon portion 10, which extends from the end of body member 14 opposite aperture 20 to a point intermediate the length of the body member, the longitudinal slot being centrally located in the body member.

As shown to advantage in FIG. 2, body member 14 is provided with a plurality of teeth 26, 28, 30, 32, 34 and 36 located along both sides of longitudinal slot 24, the teeth on one side of the slot lying in opposed relation to the teeth on the other side of the slot for reasons which will herein after be more fully set out.

A fish hook, generally designated 38, is mounted on concave surface 16 of spoon portion 10. Fish hook 38 includes a hook portion 40, which extends downwardly through longitudinal slot 24, the lower end of which hook portion is joined to a shank portion 42 which extends through an opening 44 in body member 14, the terminal portion thereof being engaged with a retaining screw 46 for maintaining fish hook 38 in position. A plurality of barbs 48 are located on shank portion 42.

A weed guard 50 having an angular portion 52 which is proximate hook portion 40 of fish hook 38, extends downwardly to body member 14 of spoon portion 10, where it issues into a connecting portion 54, the end of which is also engaged with retaining screw 46 for holding the weed guard in operative position.

Tail portion 12 may comprise a skirt, as shown in the drawings, or any other suitable member made of a flexible material such as a plastic worm or pork rind.

As illustrated in FIGS. 1-5 tail portion 12 comprises a skirt including a small tubular member 56 which is in sleeved engagement with shank portion 42 of fish hook 38 and engaged by barbs 48 to fixedly hold the member in fixed relation with the fish hook. A plurality of flexible strips 58 extend rearwardly of tubular member 56 and spoon portion 10, which tubular member and flexible strips extend partially through longitudinal slot 24 of spoon portion 10 in order to effect operation of the lure in accordance with the objects of the present invention.

As illustrated in FIG. 2 opposed teeth 26 and 36, 28 and 34, and 30 and 32 coact to frictionally engage flexible strips 58 to prevent relative movement between tail portion 12 and spoon portion 10.

As shown to advantage in the drawing, by providing a longitudinal slot in body member 14, and mounting fish hook 38 on the concave surface of body member 14, with fish hook portion 40 overlying the longitudinal slot, flexible tail portion 12 may be positioned much farther forward on the spoon than has been theretofore been possible, resulting in dramatically increasing the wobble of the spoon, and more effective results in attracting fish.

The placement of the fish hook in a position centrally of the longitudinal slot in the spoon portion enables teeth 26, 28, 30, 32, 34 and 36 to engage the skirt and, in concert with barbs 48 on fish hook shank portion 42 prevent either water pressure and/or fish bites from loosening the skirt on the fish hook.

As shown to advantage in FIG. 3, with the arrangement of the present invention, the flexible strips 58, which extend through longitudinal slot 24 produce a keel effect on the fishing lure which stabilizes the spoon portion thereof and maintains the fish hook 38 in an upwardly directed position at all times. This, along with the weed guard, substantially eliminates the snagging of the fishing lure on weeds and brush.

The fishing lure of the present invention is of simple, economic construction, the arrangement of which maintains the spoon portion and tail portion in a fixed pre-determined relationship with each other, while at the same time providing a better wobble action that has heretofore been possible, while at the same time minimizing any problems caused by entanglement with weeds or brush.

While there has been herein shown and described the presently preferred form of this invention, it is to be understood that such has been done for purposes of illustration only, and the various changes may be made therein within the scope of the appended claims.

I claim:
1. A fishing lure comprising:
   a) a spoon portion;
   b) said spoon portion having a longitudinal slot extending from an intermediate part of said spoon portion to one end thereof;
   c) tooth means along the edges of said spoon portion defining the longitudinal slot;
   d) a fish hook secured to said spoon portion and extending in overlying relation to the longitudinal slot thereof; and
   e) a flexible tail portion positioned on said fish hook, a portion of said tail portion extending through the longitudinal slot and frictionally engaged by said tooth means to prevent relative movement between said tail portion and spoon portion.
2. The fishing lure of claim 1, wherein:
   a) said tooth means comprises a plurality of spaced teeth in opposed relation along the edges of the spoon portion's longitudinal slot, said teeth being in frictional engagement with portions of said tail portion.
3. The fishing lure of claim 1, wherein:
   a) said tail portion is a skirt comprising a tubular part and flexible strips extending from one end of said tubular part;
   b) said tubular part of the tail portion being in sleeved engagement with said fish hook.
4. The fishing lure of claim 3, wherein:
   a) parts of the flexible strips of said skirt extend through the longitudinal slot of said spoon portion and are in frictional engagement with said tooth means.
5. The fishing lure of claim 4, wherein:
   a) said fish hook comprises a shank portion and a hook portion, and
   b) a barb on said shank portion of the fish hook for frictional engagement with said tubular part of said skirt.
6. The fishing lure of claim 5, with the addition of:
   a) a weed guard mounted on said spoon portion and extending upwardly therefrom in proximity to the hook portion of said fish hook.
7. A fishing lure comprising:
   a) an elongated spoon portion of cup-shape having convex and concave faces;
   b) said spoon portion being provided with a longitudinal slot extending from an intermediate part of said spoon portion to one end thereof;
   c) a fish hook extending upwardly from the concave face of said spoon portion, said fish hook being positioned longitudinally and centrally of the spoon portion with a part of the fish hook overlying the longitudinal slot;
   d) tooth means along the edges of that part of the spoon portion defining the longitudinal slot; and
   e) a tail portion having a tubular member in sleeved engagement with said fish hook;
   f) a part of said tail portion extending through the longitudinal slot of said spoon portion and engaged by said tooth means to prevent movement of the tubular member of said tail portion relative to said fish hook.
8. The fishing lure of claim 7, wherein:
   a) said longitudinal slot is tapered inwardly from the outer end of said spoon portion to an intermediate part thereof; and,
   b) said tooth means includes at least one tooth extending inwardly of said tapered slot for frictional engagement with said tail portion.
9. The fishing lure of claim 8, wherein:
   a) said tooth means includes a plurality of opposed teeth in spaced relation along both sides of said tapered longitudinal slot.
10. The fishing lure of claim 9, wherein:
    a) said tail portion is a skirt comprising a tubular part and flexible strips extending from one end of said tubular part;
    b) said tubular part of the tail portion being in sleeved engagement with said fish hook; and
    c) parts of the flexible strips of said skirt extend through the longitudinal slot of said spoon portion and are frictionally engaged by said opposed teeth.
11. The fishing lure of claim 10, with the addition of:
    a) friction means of said fish hook engaged with the tubular member of said tail portion for preventing relative movement of the tubular member of said tail portion relative to said fish hook.
12. The fishing lure of claim 11, wherein;
    a) said frictionally means comprise barbs.
13. The fishing lure of claim 12, with the addition of:
    a) a weed guard mounted on said spoon portion proximate said fish hook.

* * * * *